United States Patent [19]

Kojima et al.

[11] Patent Number: 4,840,854

[45] Date of Patent: Jun. 20, 1989

[54] REINFORCED PLATE-LIKE SINTERED BODIES

[75] Inventors: Takao Kojima; Tetsusyo Yamada, both of Nagoya, Japan

[73] Assignee: NGK Spark Plug Co., Ltd., Nagoya, Japan

[21] Appl. No.: 97,343

[22] Filed: Sep. 11, 1987

Related U.S. Application Data

[63] Continuation of Ser. No. 749,457, Jun. 27, 1985, abandoned.

[30] Foreign Application Priority Data

Jun. 27, 1984 [JP] Japan ................................ 59-130938

[51] Int. Cl.$^4$ ................................................. B32B 3/00
[52] U.S. Cl. .................................... 428/698; 428/701; 428/702
[58] Field of Search ................................ 428/698–702

[56] References Cited

U.S. PATENT DOCUMENTS

| | | | |
|---|---|---|---|
| 3,953,636 | 4/1976 | Kirchner | 428/698 X |
| 4,304,652 | 12/1981 | Chiba et al. | 204/425 |
| 4,334,974 | 6/1982 | Muller et al. | 204/425 |
| 4,340,635 | 7/1982 | Langman et al. | 428/469 X |
| 4,449,919 | 5/1984 | Takikawa et al. | 204/426 |
| 4,465,727 | 8/1984 | Fujita et al. | 428/701 X |
| 4,476,008 | 10/1984 | Sano et al. | 204/425 |
| 4,502,939 | 3/1985 | Holfelder et al. | 204/429 |
| 4,540,621 | 9/1985 | Eggerding et al. | 428/701 X |
| 4,559,277 | 12/1985 | Ito | 428/698 X |
| 4,582,745 | 4/1986 | Schnable | 428/701 X |
| 4,595,665 | 6/1986 | Takayama et al. | 428/701 X |
| 4,663,215 | 5/1987 | Dubuisson et al. | 428/698 X |
| 4,702,970 | 10/1987 | Sarin et al. | 428/698 X |
| 4,749,629 | 7/1988 | Sarin et al. | 428/698 |

FOREIGN PATENT DOCUMENTS

| | | |
|---|---|---|
| 0086501 | 2/1980 | European Pat. Off. . |
| 56-5375 | 1/1981 | Japan . |
| 56-73665 | 6/1981 | Japan . |

*Primary Examiner*—Nancy A. B. Swisher

[57] ABSTRACT

A reinforced plate-like laminated sintered body is produced by the steps of providing a green laminate with an alumina-based layer including zirconia provided at least partly over one surface of the base material and simultaneously sintering the laminated surface layer and base material layer. The thickness ratio of the surface layer with respect to the base material layer is in the range of 1/100 to 20/100 and the laminate has a ratio of shrinkage moduli, calculated as the ratio of the shrinkage modulus of the base material layer when sintered alone to the shrinkage modulus of the surface layer when sintered alone, within the range of 1.01 to 1.08.

6 Claims, No Drawings

REINFORCED PLATE-LIKE SINTERED BODIES

This application is a continuation of U.S. application Ser. No. 749,457, filed June 27, 1985 now abandoned.

FIELD OF THE INVENTION

This invention relates to means for improving the strength of plate-like sintered bodies.

BACKGROUND OF THE INVENTION

In general, one means for enhancing the strength of sintered bodies involves the addition of a predetermined amount of impurities to the base material, whereby the growth of grains during sintering is inhibited. Another means for strengthening sintered bodies involves the coating of particles on the surface of the formed base material mass, said particles having an ion radius larger than that of said base material mass, thereby to cause substitution and solid-solution formation for producing compression stress in the surface of said base material mass.

According to the reinforcing manner in which the aforesaid impurities are added, however, the strength of the base material may be affected depending upon the type of said impurities. This requires time-consuming examination of the type of impurities. Thus, such a manner for reinforcing sintered bodies cannot be said to be a generally applicable reinforcing treatment without difficulty. According to another reinforcing manner to form the coating layers, the compression stress varies depending upon the type of the coating materials, viz, the degree of substitution and solid solution formation with respect to the base material, with resulting variations in strength. This leads to the deficiency of reinforced stability and, in some cases, may result in the formation of cracks on the surface of sintered bodies.

SUMMARY OF THE DISCLOSURE

An object of the present invention is to make the strength of plate-like sintered bodies much higher than that of the base materials by simple means regardless of the type of the base materials.

DETAILED EXPLANATION OF THE PREFERRED EMBODIMENTS

Definition

In the present disclosure, the term "shrinkage modulus" refers to $l_0/l_1$ wherein $l_0$ denotes the green dimension of unsintered base or coating materials, and $l_1$ stands for the dimension of the base or coating materials after contraction due to sintering.

According to the present invention, there is provided a reinforced plate-like sintered body characterized in that an $Al_2O_3$-based surface layer having a given thickness is disposed partly or entirely over the surface of a base material formed into a plate-like shape; the ratio of the shrinkage modulus $l_0/l_1$ of said base material with respect to the shrinkage modulus $l'_0/l'_1$ of said surface layer is within a range of 1.01 to 1.08, and said base material and said surface layer have been simultaneously sintered.

As mentioned above, the bending strength of the sintered body can be increased to several times (easily 2-3 times) even with a very thin coating layer, if a coating layer having a degree of contraction smaller than that of the base material is applied on the base material. It is possible to reinforce the strength of general plate-like sintered body elements. It is also possible to coat only the portion of the base material to be reinforced with respect to strength without adversely affecting the base material.

Considering the application of such a difference in the contraction due to sintering, (1) a coating layer, which has previously been calcined to decrease the degree of contraction, may be applied, even when the coating layer and the base material are formed of the same type material, and (2) a coating layer having a small degree of contraction may be prepared by the adjustment of grain sizes. Since it is required to unite the coating layer with the base material after sintering, however, it is required to combine the coating layer with the base material in such a manner that peeling of the coating layer is at least prevented.

The plate-like sintered bodies of the present invention are obtained typically in the following manner. An $Al_2O_3$-based surface layer is formed partly or wholly on the surface of a base material formed in a plate-like shape into a predetermined thickness in such a manner that the ratio of the shrinkage modulus of the base material to the surface layer comes within a range of 1.01 to 1.08. Then, the base material (substrate) and the surface layer are simultaneously sintered. Essential herein is the ratio of the shrinkage modulus and simultaneous sintering of the substrate and coating layer (or layers). The coating layer may be applied simultaneously with base material formation, e.g., co-extrusion or the like.

The present invention is characterized in that a thin coating layer based on alumina ($Al_2O_3$) is simply applied on the surface of the base material, whereby the surface layer is densified, and a compression stress is produced on the surface of the base material, making use of a difference in the contraction between the base material and the $Al_2O_3$-based coating layer material. Various ceramic materials meeting the aforesaid ratio of the shrinkage modulus may be used as the base materials. As to the base materials, preference is given to ceramic materials such as $Al_2O_3$ and $ZrO_2$ including $ZrO_2$—$Y_2O_3$, $ZrO_2$—$CaO$ and like systems.

The surface layer may be applied on one or both sides of the plate-like base material. The thickness of the surface layer should be no higher than 1/5 of the thickness of the base material in the event that it is formed on one side thereof, and should be no higher than ½ (in total) of the thickness of the base material in the event that it is formed on both sides thereof. This is because the coating layer should be contracted according to the contraction of the base material, making use of the contraction difference upon sintering.

The use of this system has the result that, the larger the difference in the contraction (including contraction brought about by a difference in the coefficient of expansion in the course of cooling) between the base material and the surface layer during sintering, the higher the strength. However, there is a need for limiting that contraction to such a degree that the sintered bodies do not suffer cracking, warpage, etc. In view of warpage alone, the surface layers are coated on both sides of the base material formed into a plate-like shape, whereby the strength is reinforced without causing any warpage. From these, the contraction difference during sintering may be selected at one's disposal with respect to the end strength desired.

The wording "alumina-base" for the surface layer is herein understood to refer to materials which contain alumina in an amount of no lower tha 80 mol %, preferably no lower than 90 mol %, and may include as the impurities $SiO_2$, CaO or the like which usually occur. Positively, those materials may further contain as the grain growth inhibitors or sintering promotors the known, MgO, $ZrO_2$, etc. in amounts of up to 5 mol %.

The reinforced plate-like sintered bodies of the present invention may be produced by forming, for instance, a partly or wholly stabilized $ZrO_2$-based material into a plate-like shape, and applying $Al_2O_3$-base coating layers having the predetermined thickness on both surfaces thereof. The wording "plate-like" is here understood to refer to flat plates, curved or bent plates or profiles (generally, pipes or the like) formed of said curved plates. The coating layers and the base body are simultaneously sintered into a plate-like sintered body. Preferably, the thickness ratio of one coating layer of $Al_2O_3$ with respect to the $ZrO_2$-based plate-like sintered body (base material) should be 1/100 to 25/100 (more preferably 1/100 to 20/100). If required, this coating layer may be formed partly or wholly over the plate-like sintered body.

According to this system, it is possible to achieve a mechanical strength higher than that of the sintered body comprising the base material alone by a factor of two or more, since the coating layer and the base material contract integrally, and interaction occurs with each other. According to this invention, the thus obtained strength exceeds that of the $Al_2O_3$-based material per se used as the coating layer. This is considered to be due to the fact that the shrinkage moduli (green dimension/dimension after sintering) of the base material and the coating layer (material) are used in varied combinations when sintering the base meaterial onto which the coating layer has been coated. More specifically, to make the shrinkage modulus of the coating layer smaller than that of the base material would have the result that the coating layer contracts to a higher extent than the original degree of contraction during sintering resulting in further densification, and that there is produced therein a compression stress. It is considered that the higher the difference in the relative ratio of the shrinkage moduli between the coating material and the base material, the greater the resulting effect, provided that the sintered body must be free from any crack, warpage, etc. Preferably, the ratio of the shrinkage modulus of the base material to that of the coating layer material should be in a range of 1.01 to 1.08. Where that ratio is lower than 1.01, no sufficient reinforcing effect is obtained. Where that ratio is higher than 1.08, on the other hand, cracks, warpage, etc. tend to occur. The coating layer is based on $Al_2O_3$, a preferable example of which is usually alpha-$Al_2O_3$ having a purity of, preferably, no lower than 90 mol %. This is derived from the concept that sufficient incorporation of thermally and chemically stable alpha-$Al_2O_3$ is preferable from the very viewpoint of reinforcing layers.

In the present invention, it is required to make the $ZrO_2$-base base material and the coating layer integral and to use a densified coating material, which leads to the need of sintering the coating material at a temperature at which the base material is sintered. Therefore, it is preferred that the sintering aids are added to the coating material.

In the following, a preferred embodiment of the process for the production of the reinforced sintered bodies will be explained. Stabilizers such as $Y_2O_3$, CaO, MgO and the like are added to the starting $ZrO_2$ material in the predetermined amount (usually 4 to 10 mol %) for mixing in a ball mill, etc. After drying, the resulting mixture is calcined, and the thus calcined powder is pulverized to obtain a starting material for the base material. A binder such as an organic binder is added to the base material, which is formed into a plate-like shape by means of the doctor blade, extrusion, pressing or the like technique to obtain a green substrate based on the $ZrO_2$, which is partly or entirely stabilized. On the other hand, an organic binder is mixed with the starting $Al_2O_3$ material, and the resulting mixture is pasted to obtain a coating material.

The coating material is coated onto both sides of the green substrate by means of paste (screen) printing, green sheet compression bonding or thermocompression bonding, and the resulting product is sintered at 1500° to 1550° C. for 1 to 4 hours in an oxidizing atmosphere, whereby the coating (protective) layer-provided plate-like sintered body based on partly or wholly stabilized $ZrO_2$ is obtained.

According to the present invention, a bending strength higher than that of $Al_2O_3$ itself can be assured, as noted from the experimental data to be given later (in Tables 1 and 2).

The reinforced plate-like sintered bodies of the present invention, which can be produced in this manner, may have a thickness of, ca., 0.1 to 5 mm, and can be thinner than the conventional (one-layer) product having the same strength by about 20 to 40%.

EXAMPLES

The examples of the present invention will be given.

EXAMPLE I

1. Ten (10) % by weight of an organic binder (polyvinyl butyral) were added to an $Al_2O_3$-base material having a mean particle size of 1.5 microns (having a purity, by weight, of 92% and further containing 5% $SiO_2$, 2% MgO and 1% CaO) to form a sheet having a thickness of 0.8 mm (designated as Substrate I).

2. Two (2) % by weight of $ZrO_2$ having a mean particle size of 2 microns and a purity of 99% by weight were added to the composition of the Substrate I to prepare a paste (coating 1) and a sheet (coating 2).

3. The coating 1 was screen-printed on one side of the Substrate I into a thickness of about 30 microns. The coating 2 was also laminated on the Substrate I by means of thermocompression bonding.

4. Removal of resins was effected at 250° C. for 10 hours.

5. For the purpose of comparison, a paste (coating 3) and a sheet (coating 4) were formed of the composition of the Substrate I in steps similar to the steps 3 and 4.

EXAMPLE II

1. Six (6) mol % of $Y_2O_3$ were added to the starting $ZrO_2$ material (having a mean particle size of 2 microns and a purity of 99% by weight), followed by the addition of an organic binder, to thereby prepare a sheet having a thickness of 0.8 mm (designated as Substrate II).

2. Of the material of Example. I-1 a paste (coating 5) and a sheet (coating 6) were formed.

3. The coating 5 was screen-printed on both sides of the Substrate II into a thickness of about 30 microns. The coating 6 was also laminated on the Substrate II by means of thermocompression bonding (at 80° C.).

4. Removal of resins was effected at 250° C. for 10 hours. These samples were cut into a width of 5 mm and a length of 45 mm, and sintered at 1520° C. for 4 hours in the atmosphere. The sintered products were subjected to bending testing at a span of 18 mm in the three-point supporting manner. The results are set forth in Table 1 and 2.

TABLE 1

| Test Piece | No. | Structure | | Thickness of Green Coating*/ Thickness of Green Substrate | Bending Strength kg/mm² | Remarks | Range |
|---|---|---|---|---|---|---|---|
| Example I Shrinkage Modulus Substrate 1.198 Coating Layer 1.185 | 1 | Substrate I | Alone | 0/0.8 | 42 | — | A[(1)] |
| | 2 | Coating 2 | Alone | 0.8/0 | 42 | — | A |
| | 3 | Substrate I + Coating 1 | One Side | 0.03/0.8 | 52-64 | — | B[(2)] |
| | 4 | Substrate I + Coating 2 | One Side | 0.10/0.8 | 50-58 | — | B |
| | 5 | Substrate I + Coating 2 | One Side | 0.40/0.8 | 45-50 | Large Warpage | A |
| | 6 | Substrate I + Coating 3,4 | One Side | 0.03 0.10/0.8 | 40-48 | — | A |
| Example II Shrinkage Modulus Substrate 1.245 Coating Layer 1.198 | 7 | Substrate II | Alone | 0/0.8 | 18-21 | — | A |
| | 8 | Substrate II + Coating 5 | One Side | 0.06/0.8 | 50-55 | Small Warpage Produced | B |
| | 9 | Substrate II + Coating 5 | Both Sides | 0.12/0.8 | 53-60 | — | B |
| | 10 | Substrate II + Coating 6 | One Side | 0.20/0.8 | Large Warpage, No Measurement | | A |
| | 11 | Substrate II + | Both Sides | 0.40/0.8 | 51-63 | — | B |
| | 12 | Substrate II + Coating 6 | Both Sides | 0.55/0.5 | Cracks | — | A |

[(1)]A: out of the claimed scope
[(2)]B: within the claimed scope
*sum of both sides

TABLE 2

| Test Piece No. | Ratio of Shrinkage Modulus $l_0/l_1$ Subst./Coat. | Shrinkage Modulus $l_0/l_1$ | | Bending Strength kg/mm² | Thickness of Green Coating*/ Thickness of Green Substrate mm/mm | Structure | Range |
|---|---|---|---|---|---|---|---|
| 27 | 1.05 | Substrate Coating | 1.245 1.185 | 55-65 | 0.06/0.7 | Substrate II + Coating 1/Both Sides | B |
| 28 | 1.064 | Substrate | 1.275 | 30-35 | 0.06/0.7 | Substrate III + Coating 5/Both Sides | B |
| 29 | | Coating | 1.198 | 20-25 | 0/0.9 | Substrate III Alone | A |
| 30 | 1.087 | Substrate | 1.302 | About 65** | 0.06/0.75 | Substrate IV + Coating 5/Both Sides | A |
| 31 | | Coating | 1.198 | About 65 | 0/0.75 | Substrate IV Alone | A |

*Total value of both coatings
**Crackings easily occur due to snake like deformation in transverse direction of the substrate plane
In Table 2,
Substrate III: Y₂O₃ 8 moles $l_0/l_1$ = 1.275
Substrate IV: Y₂O₃ 4 moles $l_0/l_1$ = 1.302 (Substrate IV contains in total of 8 wt. % of Al₂O₃, Silica, etc.)
It is noted that the substrate (IV) containing less than 5 mol % of Y₂O₃ tends to be reduced in bending strength to about ½ after 1000 hr-durability testing at a temperature of 700° C. or less.
A: out of the claimed scope
B: within the claimed scope The product of Example I is improved in strength over that of Example 2. This is because there is a considerable difference in the contraction due to sintering between the base material (substrate) and the coating material. Since warpage, etc. occur in the event that such a difference is large, better results are obtained when the coating layer have a small thickness.

EFFECT OF THE INVENTION

Any modification may be made without departing from the gist of the present invention herein disclosed and claimed hereinbelow.

What is claimed is:
1. A reinforced plate-like laminated sintered body produced by the steps:
   (a) providing a green laminate comprising an Al₂O₃-based surface layer comprising ZrO₂ at least partly over one surface of a base material layer, the thickness ratio of said surface layer with respect to said base material layer being in the range of 1/100 to 20/100 and the laminate having a ratio of shrinkage moduli

$$\frac{l_0/l_1}{l_0'/l_1'}$$

where $l_0/l_1$ is the shrinkage modulus of the base material layer when sintered alone; $l_0'/l_1'$ is the shrinkage modulus of the surface layer when sintered alone; $l_0$ is a green length before sintering of the base material layer, $l_1$ is a length after sintering of the base material layer; $l_0'$ is a green length before sintering of the surface layer; and $l_1'$ is a length after sintering of the surface layer, and
   (b) simultaneously sintering said laminate.
2. A sintered body as defined in claim 1., wherein the surface layer comprises at least 80 mol % Al₂O₃.
3. A sintered body as defined in claim 1., wherein the surface layer comprises at least 90 mol % Al₂O₃.

4. A reinforced plate-like laminated sintered body produced by the steps:

(a) providing a green laminate comprising an Al$_2$O$_3$-based surface layer comprising ZrO$_2$ at least partly over both surfaces of a base material layer, the thickness ratio of said surface layer in total with respect to said base material layer being in the range of 1/100 to 50/100 and the laminate having a ratio of shrinkage moduli $$\frac{l_0/l_1}{l_0'/l_1'}$$

within the range of 1.01 to 1.08, where $l_0/l_1$ is the shrinkage modulus of the base material layer when sintered alone; $l_0'/l_1'$ is the shrinkage modulus of the surface layer when sintered alone; $l_0$ is a green length before sintering of the base material layer, $l_1$ is a length after sintering of the base material layer; $l_0'$ is a green length before sintering of the surface layer; and $l_1'$ is a length after sintering of the surface layer, and (b) simultaneously sintering said laminate.

5. A sintered body as defined in claim 4, wherein the surface layer comprises at least 80 mol % Al$_2$O$_3$.

6. A sintered body as defined in claim 4, wherein the surface layer comprises at least 90 mol % Al$_2$O$_3$.

* * * * *

UNITED STATES PATENT AND TRADEMARK OFFICE
CERTIFICATE OF CORRECTION

PATENT NO. : 4,840,854

DATED : June 20, 1989

INVENTOR(S) : Takao KOJIMA et al.

It is certified that error appears in the above-identified patent and that said Letters Patent is hereby corrected as shown below:

Claim 1, line 4, delete "comprising $ZrO_2$";
        line 5, after "base material layer", insert --comprising $ZrO_2$--.
Claim 4, line 4, delete "comprising $ZrO_2$";
        line 5, after "base material layer", insert --comprising $ZrO_2$--.

Signed and Sealed this

Third Day of July, 1990

*Attest:*

HARRY F. MANBECK, JR.

*Attesting Officer*      *Commissioner of Patents and Trademarks*